US010890090B2

(12) United States Patent
Inoue et al.

(10) Patent No.: US 10,890,090 B2
(45) Date of Patent: Jan. 12, 2021

(54) ENGINE

(71) Applicant: KUBOTA Corporation, Osaka (JP)

(72) Inventors: Katsushi Inoue, Sakai (JP); Hiroaki Okano, Sakai (JP); Masanori Fujiwara, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 59 days.

(21) Appl. No.: 16/212,839

(22) Filed: Dec. 7, 2018

(65) Prior Publication Data
US 2019/0186315 A1    Jun. 20, 2019

(30) Foreign Application Priority Data

Dec. 20, 2017 (JP) .................................. 2017-244512

(51) Int. Cl.
*F01N 3/023*    (2006.01)
*F01N 3/025*    (2006.01)
(Continued)

(52) U.S. Cl.
CPC ......... *F01N 3/0235* (2013.01); *F01N 3/0253* (2013.01); *F01N 3/035* (2013.01);
(Continued)

(58) Field of Classification Search
CPC ............... F02D 2200/0812; F02D 9/04; F02D 41/0245; F02D 2200/0802; F02D 41/027;
(Continued)

(56) References Cited

U.S. PATENT DOCUMENTS

| 2007/0160508 A1 | 7/2007 | Doumeki et al. |
| 2013/0081543 A1* | 4/2013 | Ikeda ..................... F01N 3/0235 96/425 |
| 2015/0361844 A1* | 12/2015 | Yoshida ................ F01N 3/0842 60/285 |

FOREIGN PATENT DOCUMENTS

| EP | 1321642 A1 | 6/2003 |
| EP | 1939422 A1 | 7/2008 |

(Continued)

OTHER PUBLICATIONS

Extended European Search Report dated May 3, 2019 in EP Applicaiton No. 18205064.1.

*Primary Examiner* — Anthony Ayala Delgado
(74) *Attorney, Agent, or Firm* — Panitch Schwarze Belisario & Nadel LLP

(57) ABSTRACT

An engine promoting DPF regeneration processing is provided. Catalyst activation processing and thereafter DPF regeneration processing are performed under control of a device. In the catalyst activation processing, a target temperature of exhaust at an exhaust exit of a catalyst is set to be in a first temperature region, and then the opening degree of an exhaust throttle device is controlled. In the DPF regeneration processing, the target temperature is set to be in a second temperature region. A target temperature of the exhaust at an exhaust inlet of a DPF is set to be in a third temperature region. The opening degree of the exhaust throttle device is controlled, and unburned fuel is supplied into the exhaust. The temperature regions are set to be successively higher, and a temperature difference between successive temperature regions is set to be successively lower.

8 Claims, 5 Drawing Sheets

(51) Int. Cl.
  *F01N 3/035* (2006.01)
  *F02D 41/02* (2006.01)
  *F02D 43/00* (2006.01)
  *F02D 9/04* (2006.01)
  *F01P 3/20* (2006.01)
  *F01N 9/00* (2006.01)
  *F01N 11/00* (2006.01)

(52) U.S. Cl.
  CPC ............ *F01N 9/002* (2013.01); *F01N 11/002* (2013.01); *F02D 9/04* (2013.01); *F02D 41/025* (2013.01); *F02D 41/029* (2013.01); *F02D 43/00* (2013.01); *F01N 2240/36* (2013.01); *F01N 2430/06* (2013.01); *F01N 2560/06* (2013.01); *F01N 2900/0416* (2013.01); *F01N 2900/1404* (2013.01); *F01N 2900/1602* (2013.01); *F01N 2900/1626* (2013.01); *F01P 3/20* (2013.01); *F01P 2060/00* (2013.01); *F02D 2200/0802* (2013.01)

(58) Field of Classification Search
  CPC ...... F01N 9/002; F01N 2240/36; F01N 3/021; F01N 3/023; F01N 3/0235; F01N 2560/06; F01N 2900/1602; F01N 2900/1404; F01N 11/005; F01N 2260/04; F01N 3/0232; B01D 46/448; F02B 37/22; B60L 2240/445
  See application file for complete search history.

(56) References Cited

FOREIGN PATENT DOCUMENTS

| | | |
|---|---|---|
| EP | 1998015 A1 | 12/2008 |
| EP | 3015665 A1 | 5/2016 |
| JP | 2010-185340 A | 8/2010 |

* cited by examiner

ENGINE

CROSS-REFERENCE TO RELATED APPLICATION

This application claims priority under 35 U.S.C. § 119(b) to Japanese Patent Application No. 2017-244512, filed Dec. 20, 2017, the disclosure of which is incorporated herein by reference in its entirety.

BACKGROUND OF THE INVENTION

(1) Field of the Invention

The present invention relates to an engine.

(2) Description of Related Art

In a conventional engine, at transition from catalyst activation processing to DPF regeneration processing, sometimes an exhaust throttle device abruptly opens and the temperature of exhaust abruptly drops due to abrupt drop of back pressure, and accordingly, supply of unburned fuel by post-injection or the like is stopped, which leads to stagnation of DPF regeneration.

SUMMARY OF THE INVENTION

The present invention is intended to provide an engine in which DPF regeneration is promoted.

In the present invention, catalyst activation processing and thereafter DPF regeneration processing are performed under control of the control device. In the catalyst activation processing, a target temperature of exhaust at an exhaust exit of the catalyst is set to be in a first temperature region, and then the opening degree of the exhaust throttle device is controlled. In the DPF regeneration processing, the target temperature is set to be in a second temperature region, and a target temperature of the exhaust at an exhaust inlet of the DPF is set to be in a third temperature region, and then the opening degree of the exhaust throttle device is controlled, and unburned fuel is supplied into the exhaust. The second temperature region is set to be higher than the first temperature region, the third temperature region is set to be higher than the second temperature region, and a temperature difference between the first temperature region and the second temperature region is set to be larger than a temperature difference between the second temperature region and the third temperature region.

The exhaust temperature sensor is preferably disposed between the catalyst and the exhaust throttle device on an exhaust downstream side of the catalyst.

The exhaust temperature sensor may be disposed at a position on an exhaust downstream side of the exhaust throttle device on an exhaust downstream side of the catalyst and close to the exhaust throttle device.

According to the present invention, DPF regeneration is promoted.

BRIEF DESCRIPTION OF THE DRAWINGS

FIGS. 1A, 1B, and 1C are pattern diagrams for describing an exhaust device of an engine according to a first embodiment of the present invention, in which FIG. 1A illustrates a basic example, FIG. 1B illustrates a modification in which a catalyst case is attached in a different structure, and FIG. 1C illustrates a modification in which an exhaust temperature sensor is differently disposed;

DETAILED DESCRIPTION OF PREFERRED EMBODIMENTS

Figure 3:
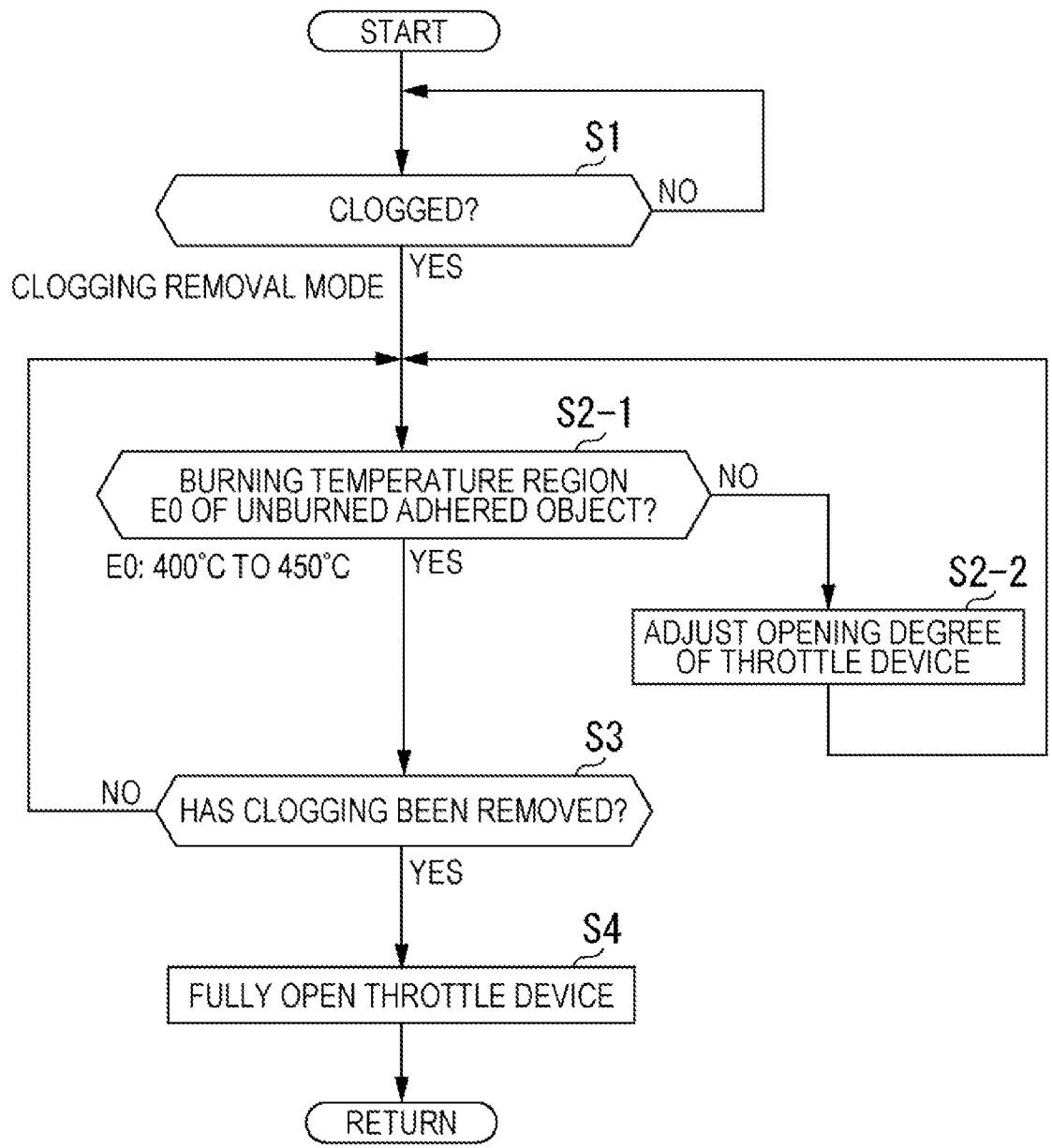
FIG. 3 is a flowchart for describing control of a clogging removal mode of the engine illustrated in FIGS. 1A, 1B, and 1C.
Figure 4:
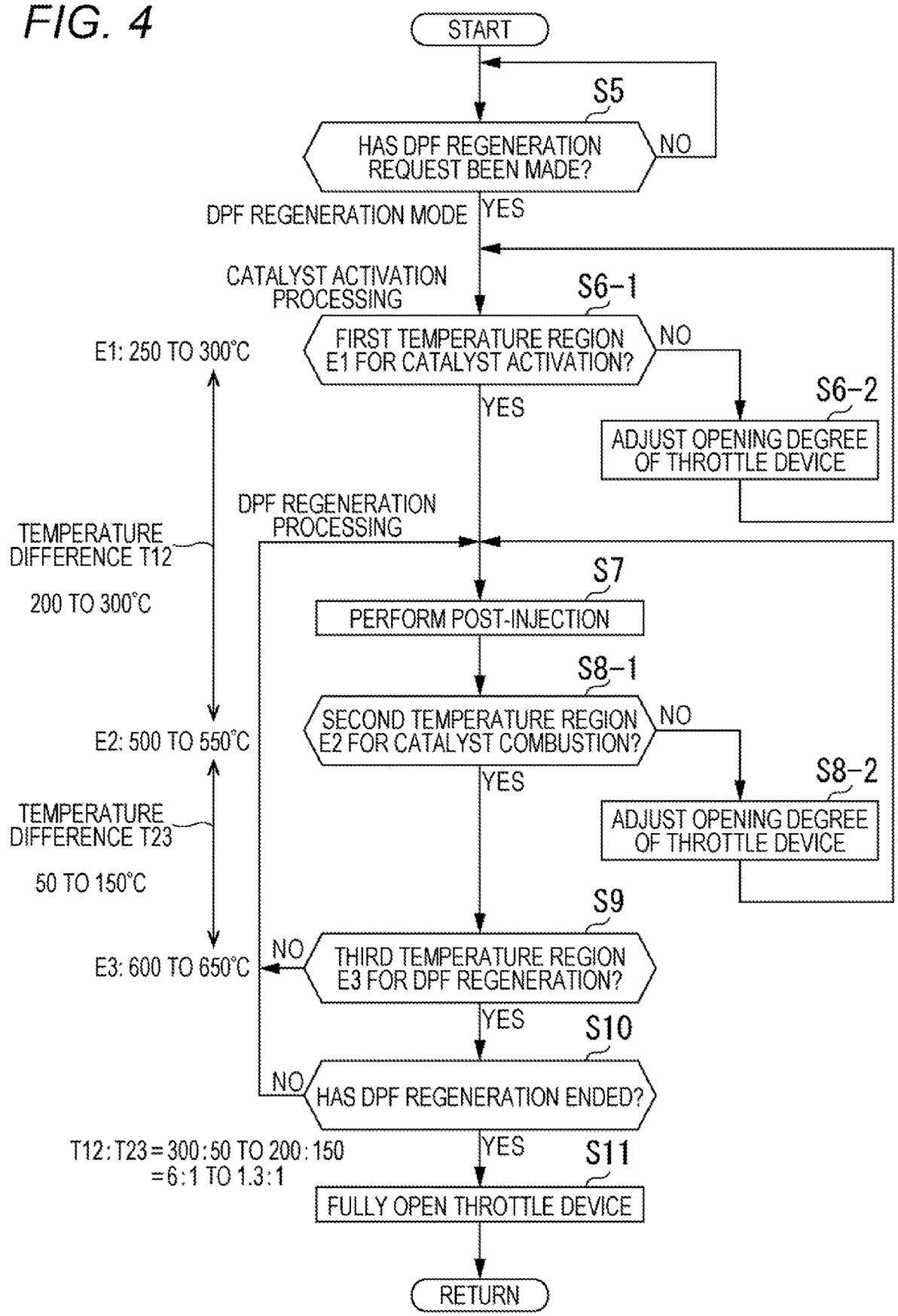
FIG. 4 is a flowchart for describing control of a DPF regeneration mode of the engine illustrated in FIGS. 1A, 1B, and 1C.
Figure 5:
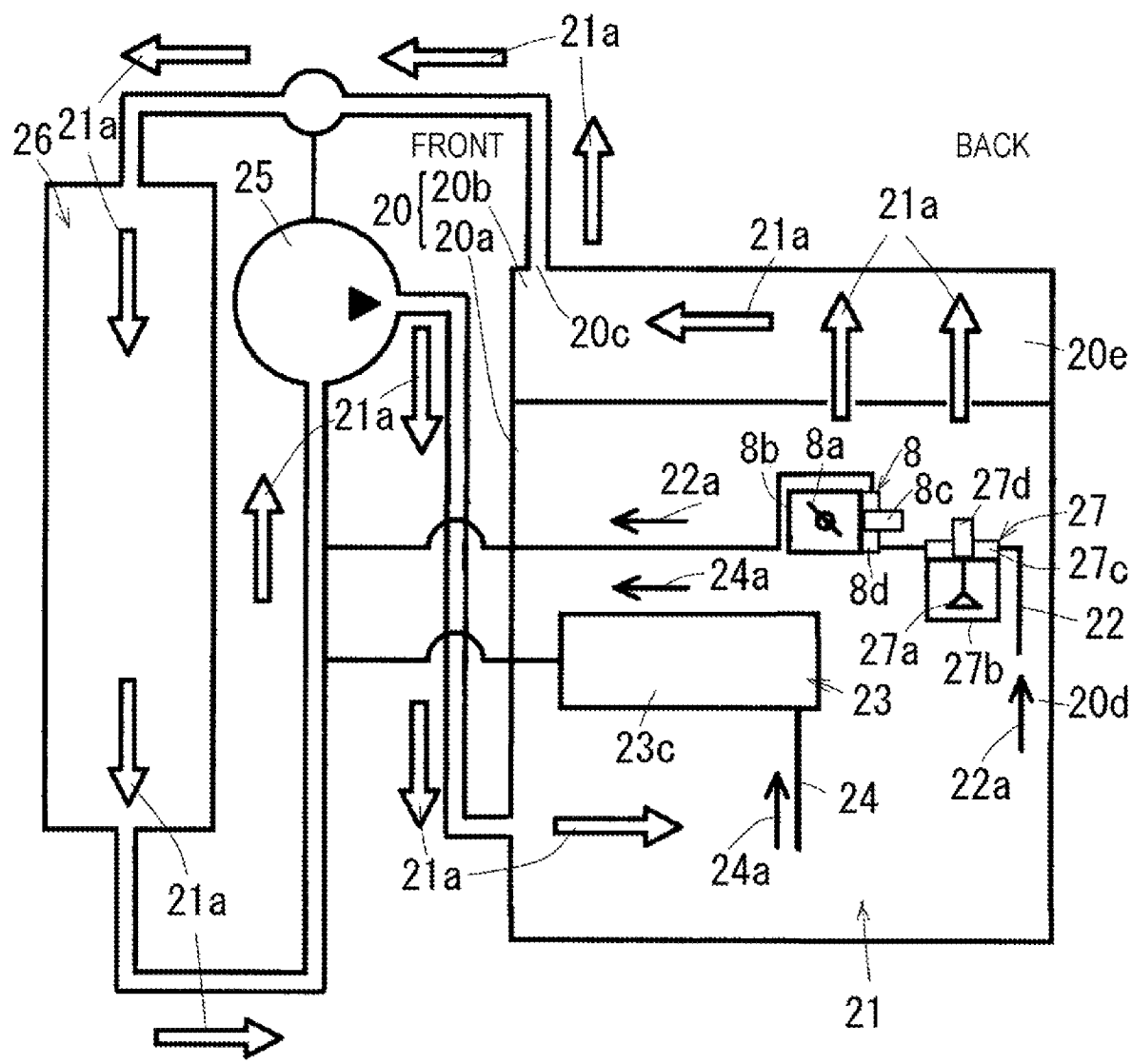
FIG. 5 is a pattern diagram for describing a water cooling device of an engine according to a second embodiment of the present invention.

FIGS. 1A to 4 are diagrams for describing an engine according to a first embodiment of the present invention, and FIG. 5 is a diagram for describing an engine according to a second embodiment of the present invention.

Each embodiment employs a vertical type water-cooled serial multicylinder diesel engine.

The following describes the engine according to the first embodiment of the present invention.

Figure 1A:
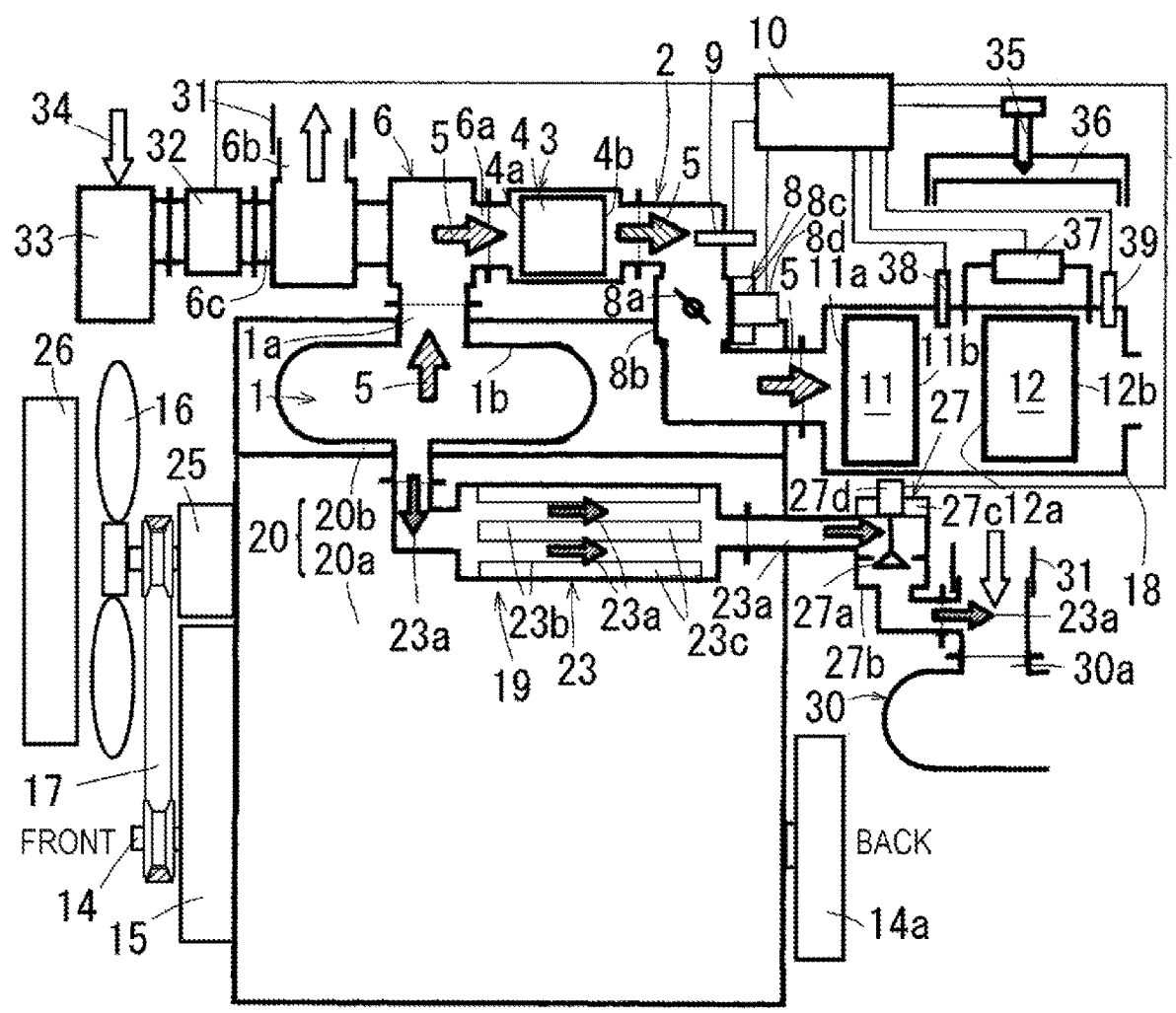

As illustrated in FIG. 1A, the engine includes a cylinder block (20a), and a cylinder head (20b) attached above the cylinder block (20a). When a front-back direction is defined to be a direction in which a crankshaft (14) is extended, a front side is defined to be one side in the front-back direction, and a back side is defined to be the other side, a cooling water pump (25) and a timing transmission case (15) are assembled on the front side of the cylinder block (20a). An engine cooling fan (16) is attached to a pump input shaft of the cooling water pump (25), and the cooling water pump (25) and the engine cooling fan (16) are driven by the crankshaft (14) through a fan belt (17). A radiator (26) is disposed on the front side of the engine cooling fan (16). A flywheel (14a) attached to a back end part of the crankshaft (14) is disposed on the back side of the cylinder block (20a).

As illustrated in FIG. 1A, when a lateral direction is defined to be the width direction of the engine, an exhaust manifold (1) is assembled on one side of the cylinder head (20b) in the lateral direction, and an exhaust lead-out path (2) is led out from a manifold exit (1a) of the exhaust manifold (1). The exhaust lead-out path (2) includes a supercharger (6), a catalyst case (3), an exhaust throttle device (8), and an exhaust cleaning case (18), which are disposed sequentially from an exhaust upstream side. Exhaust (5) flowing out of the manifold exit (1a) of the exhaust manifold (1) sequentially passes through a turbine of the supercharger (6), the catalyst case (3), the exhaust throttle device (8), and the exhaust cleaning case (18), and then is discharged.

As illustrated in FIG. 1A, an intake manifold (30) is assembled on the other side of the cylinder head (20b) in the lateral direction, and a manifold inlet (30a) of the intake manifold (30) is connected with a compressor exit (6b) of the supercharger (6) through a supercharge pipe (31). A compressor inlet (6c) is connected with an air cleaner (33) through an air flow sensor case (32). Air (34) is supercharged to the intake manifold (30) sequentially through the air cleaner (33), a compressor of the supercharger (6), the supercharge pipe (31), and the manifold inlet (30a).

As illustrated in FIG. 1A, an EGR gas derive path (19) is led out from the exhaust manifold (1) and provided with an EGR cooler (23) and an EGR valve device (27) sequentially from the lead-out upstream side, and has a lead-out end connected with the manifold inlet (30a) of the intake manifold (30). Part of the exhaust (5) separated from the exhaust of the exhaust manifold (1) is supplied as EGR gas (23a) to the intake manifold (30) sequentially through the EGR cooler (23) and the EGR valve device (27).

The engine includes a fuel injection valve (35) of a common-rail fuel injection device, and a control device (10) configured to control opening of the fuel injection valve (35). The control device (10) sets the timing and amount of fuel injection through the fuel injection valve (35) based on a target engine rotation speed, an actual engine rotation speed, an engine load, an intake volume, and an intake temperature, each detected by a predetermined sensor.

The control device (10) is achieved by an engine ECU. "ECU" abbreviates an electronic control unit, and is a microcomputer.

Figure 1B:
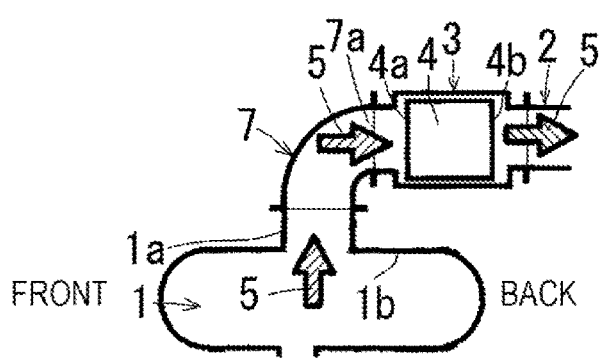

As illustrated in FIGS. 1A and 1B, the engine includes the exhaust manifold (1), the exhaust lead-out path (2) led out from the manifold exit (1a) of the exhaust manifold (1), the catalyst case (3) provided on the exhaust lead-out path (2), and a catalyst (4) housed in the catalyst case (3).

When the front-back direction is defined to be a direction in which the crankshaft (14) is extended, the exhaust manifold (1) and the catalyst case (3) are both extended in the front-back direction and disposed side by side in a direction orthogonal to the front-back direction.

This engine has the following advantage.

The catalyst case (3) is disposed at a position close to the manifold exit (1a) of the exhaust manifold (1), and thus the temperature of exhaust (5) flowing out of the manifold exit (1a) is unlikely to decrease before the exhaust (5) reaches the catalyst (4), which promotes activation of the catalyst (4).

Heat release from the catalyst case (3) is reduced by radiation heat from a wall (1b) of the exhaust manifold (1), and thus the temperature of the catalyst (4) is unlikely to decrease, and the activation temperature of the catalyst (4) is likely to be maintained.

The exhaust manifold (1) and the catalyst case (3) are vertically disposed. The catalyst case (3) is disposed at the upper side, and the exhaust manifold (1) is disposed at the lower side.

The catalyst case (3) is made of metal and disposed above and along the upper wall (1b) of the exhaust manifold (1).

The catalyst case (3) may be disposed on the lower side, and the exhaust manifold (1) may be disposed on the upper side.

The exhaust manifold (1) and the catalyst case (3) may be laterally arranged side by side at the same height, or may be laterally arranged side by side at different heights.

The catalyst (4) on the exhaust upstream side of the exhaust throttle device (8) is a catalyst that cleans any harmful component in the exhaust (5), catalytically combusts unburned fuel, and is used for exhaust cleaning and exhaust temperature increase.

The catalyst (4) is a DOC. "DOC" abbreviates a diesel oxidation catalyst. The DOC is of a flow-through honeycomb type in which a large number of cells along the axial length direction are arranged side by side in a penetrating manner. In the DOC, an oxidation catalyst component is supported in each cell. In the DOC, HC (hydrocarbon) and CO (carbon monoxide) in the exhaust (5) are oxidized into $H_2O$ (water) and $CO_2$. In the DOC, unburned fuel supplied into the exhaust (5) is catalytically combusted so that the temperature of the exhaust (5) increases and a DPF (12) disposed downstream is regenerated. When a catalyst downstream side catalyst (13) is used in place of the DPF (12), the temperature thereof increases, and activation thereof is achieved.

"DPF" abbreviates a diesel particulate filter, and captures PM included in the exhaust (5). "PM" abbreviates a particulate matter.

The DPF (12) is of a wall-flow honeycomb type in which a large number of cells along the axial length direction are arranged side by side, and an exhaust inlet (12a) of each cell is sealed with an exhaust exit (12b) of an adjacent cell.

The catalyst (4) on the exhaust upstream side of the exhaust throttle device (8) may be an SCR catalyst or an $NO_x$ occlusion reduction catalyst.

"SCR catalyst" abbreviates a selective catalytic reduction catalyst. The SCR catalyst is of a flow-through honeycomb type in which a large number of cells along the axial length direction are arranged side by side in a penetrating manner. A urea water injector is disposed on the exhaust upstream side of the SCR catalyst, and injects urea water into the exhaust to obtain ammonia gas under high temperature. The ammonia reduces $NO_x$ (nitrogen oxide), thereby obtaining $N_2$ (nitrogen gas) and $H_2O$ (steam).

The $NO_x$ occlusion reduction catalyst temporarily occludes $NO_x$ in the exhaust and reduces $NO_x$ (into $N_2$).

As illustrated in FIG. 1A, the engine includes the supercharger (6) attached to the manifold exit (1a) of the exhaust manifold (1), and the catalyst case (3) is attached to a turbine exit (6a) of the supercharger (6).

This engine has the following advantage.

The catalyst case (3) is disposed at a position close to the manifold exit (1a) of the exhaust manifold (1), which is likely to promote activation of the catalyst (4).

As illustrated in FIG. 1B, attachment of the catalyst case (3) may be modified as follows.

Specifically, the engine may include an exhaust relay pipe (7) attached to the manifold exit (1a) of the exhaust manifold (1), and the catalyst case (3) may be attached to a relay pipe exit (7a) of the exhaust relay pipe (7).

In this case, the engine has the following advantage, which is same as that described above.

Specifically, the catalyst case (3) is disposed at a position close to the manifold exit (1a) of the exhaust manifold (1), which promotes activation of the catalyst (4).

The exhaust relay pipe (7) is an elbow pipe.

As illustrated in FIG. 1A, the engine includes the exhaust throttle device (8) provided on an exhaust downstream side of the catalyst (4).

This engine has the following advantage.

Increase of back pressure due to throttle of the exhaust throttle device (8) increases the temperature of the exhaust (5) and the temperature of the catalyst (4), which promotes burning of any unburned object adhered to an exhaust inlet (4a) of the catalyst (4) and activation of the catalyst (4).

The unburned object adhered to the exhaust inlet (4a) of the catalyst (4) is a composite of unburned fuel of main injection fuel and PM, and is likely to accumulate at the catalyst (4) when the engine load is small and the exhaust temperature is low, and clog the exhaust inlet (4a) of the catalyst (4).

As illustrated in FIG. 1A, the engine further includes: an exhaust temperature sensor (9) disposed between the catalyst (4) and the exhaust throttle device (8); and the control device (10) configured to control the exhaust temperature sensor (9) and the exhaust throttle device (8) to cooperate with each other. The control device (10) adjusts the opening degree of the exhaust throttle device (8) based on the temperature of the exhaust (5) detected by the exhaust temperature sensor (9).

In this case, this engine has the following advantage.

Increase of the temperature of the exhaust (5) upstream of the exhaust throttle device (8) can be immediately detected by the exhaust temperature sensor (9) configured to directly detect the temperature of the exhaust (5) upstream of the exhaust throttle device (8). Thus, delay in control of the opening degree of the exhaust throttle device (8) is unlikely to occur, and hence the temperature of the exhaust (5) does not increase too much, which leads to reduction of thermal degradation of the exhaust throttle device (8).

Figure 1C:
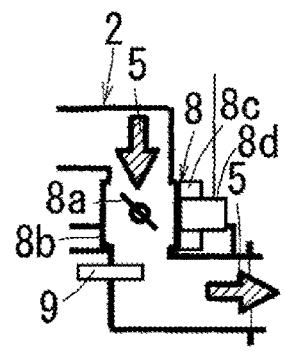

As illustrated in FIG. 1C, the engine may further include: the exhaust temperature sensor (9) disposed at a position on the exhaust downstream side of the exhaust throttle device (8) and close to the exhaust throttle device (8); and the control device (10) configured to control the exhaust temperature sensor (9) and the exhaust throttle device (8) to cooperate with each other. The control device (10) may adjust the opening degree of the exhaust throttle device (8) based on the temperature of the exhaust (5) detected by the exhaust temperature sensor (9).

In this case, this engine has the following advantage.

Increase of the temperature of the exhaust (5) upstream of the exhaust throttle device (8) can be immediately detected by the exhaust temperature sensor (9) configured to detect the temperature of the exhaust (5) at a position close to the exhaust throttle device (8) on the exhaust downstream side of the exhaust throttle device (8). Thus, delay in control of the opening degree of the exhaust throttle device (8) is unlikely to occur, and hence the temperature of the exhaust (5) does not increase too much, which leads to reduction of thermal degradation of the exhaust throttle device (8).

The separation distance between the exhaust throttle device (8) and the exhaust temperature sensor (9) is sufficiently shorter than the separation distance between the exhaust throttle device (8) and the throttle downstream side catalyst (11). The former is preferably less than half of the latter, more preferably less than one-third of the latter.

As illustrated in FIG. 1A, the engine further includes the throttle downstream side catalyst (11) disposed downstream of the exhaust throttle device (8). The control device (10) estimates the temperature of the exhaust (5) on an exhaust inlet (11a) side of the throttle downstream side catalyst (11) of the exhaust throttle device (8) based on the temperature of the exhaust (5) detected by the exhaust temperature sensor (9), and controls exhaust processing using the throttle downstream side catalyst (11) based on the estimated temperature of the exhaust (5).

This engine has the following advantage.

The exhaust temperature sensor (9) used to control the exhaust throttle device (8) is also used to control the exhaust processing using the throttle downstream side catalyst (11), which leads to reduction of the number of exhaust temperature sensors.

The throttle downstream side catalyst (11) may be same as the throttle upstream side catalyst (4). The throttle downstream side catalyst (11) is a DOC that is same as the throttle upstream side catalyst (4).

As illustrated in FIG. 1A, the exhaust processing using the throttle downstream side catalyst (11) involves exhaust temperature increasing processing of catalytically combusting unburned fuel supplied into the exhaust (5) with the throttle downstream side catalyst (11).

This engine has the following advantage.

The regeneration of the DPF (12) is prompted through the exhaust temperature increasing processing of the throttle downstream side catalyst (11).

The throttle downstream side catalyst (11) and the DPF (12) are housed in the exhaust cleaning case (18). The throttle downstream side catalyst (11) is disposed on the exhaust upstream side, and the DPF (12) is disposed on the exhaust downstream side.

A water cooling device has the following configuration.

Figure 2:
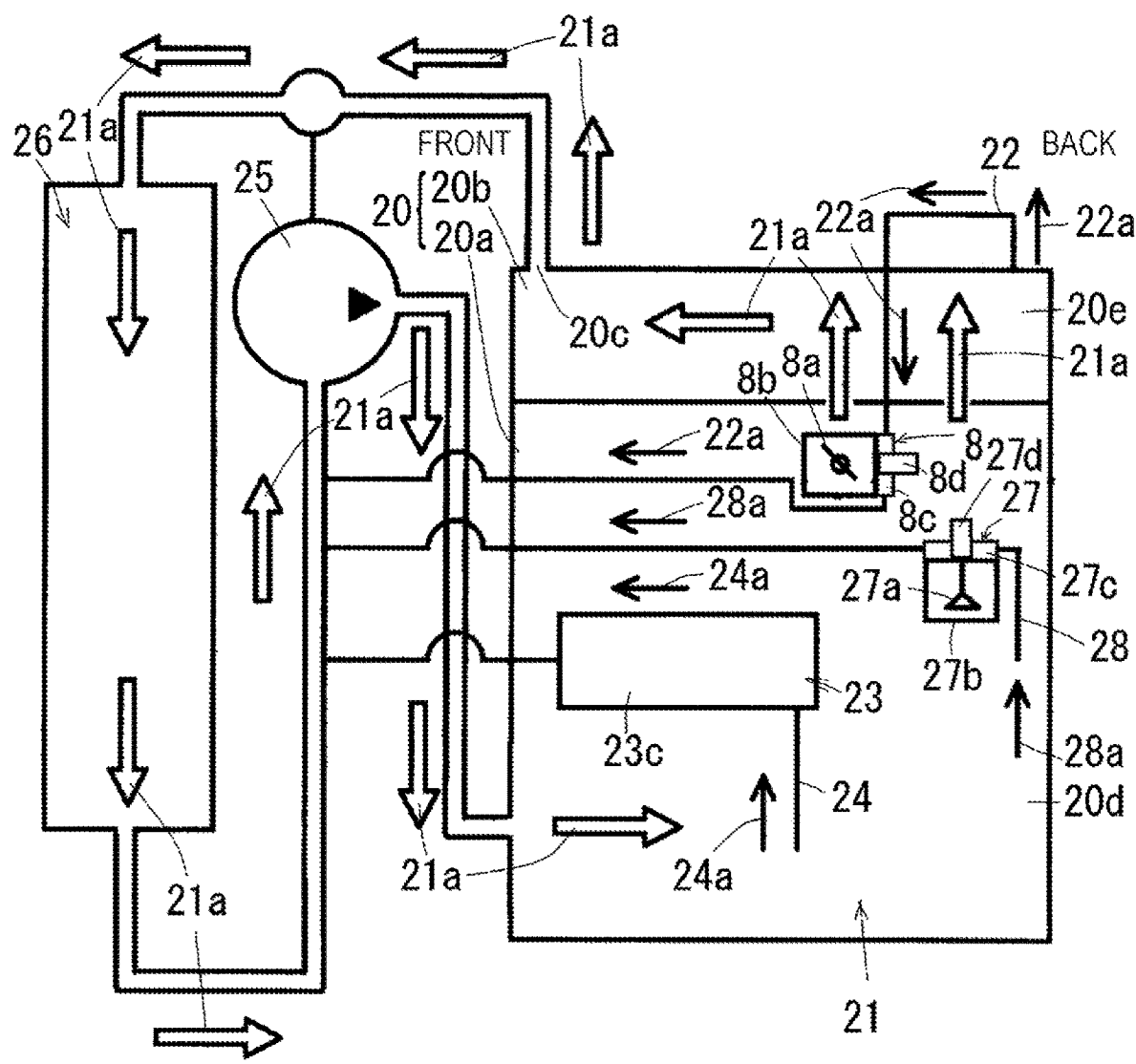
FIG. 2 is a pattern diagram for describing a water cooling device of the engine illustrated in FIGS. 1A, 1B, and 1C.

As illustrated in FIG. 2, the engine further includes: a main water path (21) in which an engine body (20) is water-cooled; and a bypass water path (22) bifurcated from the main water path (21). The bypass water path (22) is connected with the exhaust throttle device (8).

This engine has the following advantage.

The exhaust throttle device (8) heated by the exhaust (5) is water-cooled, and the temperature of the exhaust throttle device (8) decreases accordingly, which leads to reduction of thermal degradation of the exhaust throttle device (8).

The exhaust throttle device (8) includes an exhaust throttle valve (8a), a valve case (8b), a water jacket (8c) along the valve case (8b), and a valve drive actuator (8d) penetrating through the water jacket (8c). Bypass cooling water (22a) to the exhaust throttle device (8) passes through the water jacket (8c) and water-cools the valve case (8b) and the valve drive actuator (8d).

As illustrated in FIG. 2, the engine further includes: the EGR cooler (23); and a pair of bypass water paths (22) and (24) individually bifurcated from the main water path (21) in which the engine body (20) is water-cooled. The pair of bypass water paths (22) and (24) are individually connected with the exhaust throttle device (8) and the EGR cooler (23), respectively.

This engine has the following advantage.

The pair of bypass water paths (22) and (24) individually connected with the exhaust throttle device (8) and the EGR cooler (23), respectively, have small water path resistances, a large amount of bypass cooling water (22a) is supplied to the exhaust throttle device (8), and thus the temperature of the exhaust throttle device (8) decreases, which leads to reduction of thermal degradation of the exhaust throttle device (8).

Since the pair of bypass water paths (22) and (24) have small water path resistances, a large amount of bypass cooling water (24a) is supplied to the EGR cooler (23), and thus the temperature of the EGR gas (23a) decreases and the density of the EGR gas (23a) increases, which leads to an increased EGR ratio.

The EGR cooler (23) includes a plurality of heat release pipes (23b) through which the EGR gas (23a) passes, and a water jacket (23c) surrounding the heat release pipes (23b) side by side. The EGR gas (23a) is water-cooled by the bypass cooling water (24a) passing through the water jacket (23c).

As illustrated in FIG. 2, the main water path (21) has a configuration in which main cooling water (21a) is driven by the cooling water pump (25) to sequentially circulate through a water jacket (20d) of the cylinder block (20a), a water jacket (20e) of the cylinder head (20b), and the radiator (26).

The bypass water path (24) connected with the EGR cooler (23) is bifurcated from the water jacket (20d) of the cylinder block (20a).

This engine has the following advantage.

The bypass cooling water (24a) separated from the main cooling water (21a) at relatively low temperature yet to be heated to high temperature at the cylinder head (20b) is supplied to the EGR cooler (23), which leads to increase of cooling performance of the EGR cooler (23).

The bypass water path (22) connected with the exhaust throttle device (8) is bifurcated from the water jacket (20e) of the cylinder head (20b).

This engine has the following advantage.

The bypass cooling water (22a) at appropriate temperature having absorbed heat from the cylinder block (20a) and the cylinder head (20b) is supplied to the exhaust throttle device (8) at high temperature, thereby preventing actuation defect of the exhaust throttle device (8) due to overcooling.

As illustrated in FIG. 2, when the front-back direction is defined to be the direction in which the crankshaft (14) is extended, a front side is defined to be an optional one side in the front-back direction, and a back side is defined to be the other side, the water jacket (20e) of the cylinder head (20b) includes, on the front side, a main cooling water exit (20c) through which the main cooling water (21a) is fed out to the radiator (26), and the bypass water path (22) connected with the exhaust throttle device (8) is bifurcated on the back side of the water jacket (20e) of the cylinder head (20b).

This engine has the following advantage.

The bypass cooling water (22a) separated from the main cooling water (21a) at relatively low temperature before reaching the main cooling water exit (20c) is supplied to the exhaust throttle device (8), which leads to increase of cooling performance of the exhaust throttle device (8).

As illustrated in FIG. 2, the engine further includes the EGR valve device (27), and the EGR valve device (27) is connected with a bypass water path (28) bifurcated from the main water path (21) other than the pair of bypass water paths (22) and (24).

This engine has the following advantage.

The bypass water path (28) not connected with the EGR cooler (23) and the exhaust throttle device (8) has a small water path resistance, a large amount of bypass cooling water (28a) is supplied to the EGR valve device (27), and the temperature of the EGR valve device (27) decreases, which leads to reduction of thermal degradation of the EGR valve device (27).

The EGR valve device (27) includes an EGR valve (27a), a valve case (27b), a water jacket (27c) along the valve case (27b), and a valve drive actuator (27d) penetrating through the water jacket (27c). The bypass cooling water (28a) to the EGR valve device (27) passes through the water jacket (27c) and water-cools the valve case (27b) and the valve drive actuator (27d).

As illustrated in FIG. 2, the bypass water path (28) connected with the EGR valve device (27) is bifurcated from the water jacket (20d) of the cylinder block (20a).

This engine has the following advantage.

The bypass cooling water (28a) separated from the main cooling water (21a) at relatively low temperature yet to be heated to high temperature at the cylinder head (20b) is supplied to the EGR valve device (27), which leads to increase of cooling performance of the EGR valve device (27).

The flow of control of the engine is as follows.

In the engine, the following control is performed by the control device (10).

A clogging removal mode illustrated in FIG. 3 is executed when it is determined that the exhaust inlet (4a) of the catalyst (4) is clogged by an unburned adhered object.

A DPF regeneration mode illustrated in FIG. 4 is executed when PM accumulates at the DPF (12) and a DPF regeneration request is made.

When the DPF regeneration request is made during the clogging removal mode, clogging of the exhaust inlet (4a) of the catalyst (4) is removed in the clogging removal mode, and then the DPF regeneration mode is executed.

When the determination of clogging of the catalyst (4) is positive during the DPF regeneration mode, clogging of the exhaust inlet (4a) of the catalyst (4) is removed in the clogging removal mode, and then the DPF regeneration mode is resumed.

As illustrated in FIG. 3, it is determined whether the exhaust inlet (4a) of the catalyst (4) is clogged by an unburned adhered object at step (S1). When the clogging determination at step (S1) is negative, step (S1) is repeated until the determination is positive.

When an accumulated time in which the temperature of the exhaust (5) detected by the exhaust temperature sensor (9) at an exhaust exit (4b) of the catalyst (4) is continuously maintained in a predetermined low-temperature state has not reached a predetermined time, it is estimated that no clogging is present, and the determination at step (S1) is negative. When the accumulated time has reached the predetermined time, it is estimated that clogging is present, and the determination at step (S1) is positive. The pressure difference between the exhaust inlet (4a) and the exhaust exit (4b) of the catalyst (4) may be detected, and the clogging determination may be positive when the pressure difference is equal to or larger than a predetermined pressure, or the clogging determination may be negative when the pressure difference is smaller than the predetermined pressure.

When the determination at step (S1) is positive, the process transitions to step (S2-1).

At step (S2-1), it is determined whether the temperature of the exhaust (5) detected by the exhaust temperature sensor (9) is in a burning temperature region of an unburned object adhered to the exhaust inlet (4a). When the determination is positive, the process transitions to step (S3). When the determination at step (S2-1) is negative, the opening degree of the exhaust throttle device (8) is adjusted at step (S2-2). The burning temperature region is set to be, for example, 400° C. to 450° C. When the detected temperature of the exhaust (5) is lower than this region, the adjustment is performed to reduce the opening degree of the exhaust throttle device (8). When the temperature of the exhaust (5) exceeds the region, the adjustment is performed to increase the opening degree of the exhaust throttle device (8).

At step (S3), it is determined whether the clogging of the catalyst (4) is removed. When the determination at step (S3) is positive, the process transitions to step (S4). When the determination at step (S3) is negative, the process returns to step (S2-1).

At step (S3), when the accumulated time in which the temperature of the exhaust (5) detected by the exhaust temperature sensor (9) is maintained at the burning temperature of the unburned adhered object has reached the predetermined time, it is estimated that the clogging has been removed, and the determination at step (S3) is positive. When the accumulated time has not reached the predetermined time, it is estimated that the clogging has not been removed, and the determination at step (S3) is negative. The pressure difference between the exhaust inlet (4a) and the exhaust exit (4b) of the catalyst (4) may be detected, and the determination at step (S3) may be positive when the pressure difference is smaller than a predetermined pressure, or the determination at step (S3) may be negative when the pressure difference is equal to or larger than the predetermined pressure.

At step (S4), the exhaust throttle device (8) is fully opened, and the process returns to step (S1).

As illustrated in FIG. 4, at step (S5), it is determined whether the DPF regeneration request has been made. When the regeneration request determination is positive, the process transitions to step (S6-1), and the DPF regeneration mode is executed.

The DPF regeneration request is made by the control device (10) when an estimated accumulation value of PM accumulated at the DPF (12) has reached a predetermined value.

The PM estimated accumulation value is calculated by detecting a pressure difference between the exhaust inlet (12a) and the exhaust exit (12b) of the DPF (12). The DPF regeneration is requested when the pressure difference is equal to or larger than a predetermined pressure, but the DPF regeneration is not requested when the pressure difference is smaller than the predetermined pressure.

In the DPF regeneration mode illustrated in FIG. 4, a target exhaust temperature of the exhaust (5) detected by the exhaust temperature sensor (9) is set to be in a catalyst activation temperature region appropriate for activation of the catalyst (4) and the throttle downstream side catalyst (11).

At step (S6-1) illustrated in FIG. 4, it is determined whether the temperature of the exhaust (5) detected by the exhaust temperature sensor (9) is in the catalyst activation temperature region. When the determination at step (S6-1) is positive, the process transitions to step (S7). When the determination at step (S6-1) is negative, the opening degree of the exhaust throttle device (8) is adjusted at step (S6-2), and the process returns to step (S6-1).

The catalyst activation temperature region is set to be, for example, 250° C. to 300° C. When the temperature of the exhaust (5) detected by the exhaust temperature sensor (9) is lower than this region, the opening degree of the exhaust throttle device (8) is adjusted to decrease. When the temperature of the exhaust (5) exceeds the region, the opening degree of the exhaust throttle device (8) is adjusted to increase. In this manner, the temperature of the exhaust (5) is adjusted to be in the catalyst activation temperature region as the target exhaust temperature.

After the temperature of the exhaust (5) has reached the catalyst activation temperature region as the target exhaust temperature, the control device (10) sets the target exhaust temperature of the exhaust (5) detected by the exhaust temperature sensor (9) to be in a DPF regeneration temperature region appropriate for a regeneration temperature of the DPF (12). The DPF regeneration temperature region is set to be higher than the catalyst activation temperature region, and, for example, 500° C. to 550° C.

Accordingly, the temperature at the exhaust inlet (12a) of the DPF (12) is adjusted to 600° C. to 650° C., which is appropriate for regeneration of the DPF (12).

At step (S7), post-injection is performed, and the process transitions to step (S8-1).

The post-injection is fuel injection into a combustion room (36) performed at expansion stroke or exhaust stroke after main injection from the fuel injection valve (35) in a combustion cycle.

Unburned fuel supplied into the exhaust (5) by the post-injection is catalytically combusted with the catalyst (4) and the throttle downstream side catalyst (11), and the temperature of the exhaust (5) increases. Accordingly, the PM accumulated at the DPF (12) is burned and removed, and the DPF (12) is regenerated.

The timing and amount of the post-injection from the fuel injection valve (35) are set and controlled by the control device (10) based on the intake volume detected at the air flow sensor case (32), the back pressure detected by a back pressure sensor (40) between the catalyst (4) and the exhaust throttle device (8), the temperature of the exhaust (5) detected by the exhaust temperature sensor (9), the temperature of the exhaust (5) detected by an exhaust temperature sensor (38) at the exhaust inlet (12a) of the DPF (12), and the like.

Supply of unburned fuel to the exhaust (5) may be performed by exhaust pipe injection in which fuel is injected into the exhaust lead-out path (2) through a fuel injection nozzle, instead of the post-injection.

At step (S8-1), it is determined whether the temperature of the exhaust (5) detected by the exhaust temperature sensor (9) is in a catalytic combustion temperature region. When the determination at step (S8-1) is positive, the process transitions to step (S9). When the determination at step (S8-1) is negative, the opening degree of the exhaust throttle device (8) is adjusted at step (S8-2), and the process returns to step (S7). When the temperature of the exhaust (5) detected by the exhaust temperature sensor (9) is lower than the catalytic combustion temperature region, the opening degree of the exhaust throttle device (8) is adjusted to decrease. When the temperature of the exhaust (5) exceeds the region, the opening degree of the exhaust throttle device (8) is adjusted to increase. In this manner, the detected temperature of the exhaust (5) is set to be in the catalytic combustion temperature region as the target exhaust temperature.

At step (S9), it is determined whether the temperature of the exhaust (5) detected by the exhaust temperature sensor (38) at the exhaust inlet (12a) of the DPF (12) is in the DPF regeneration temperature region. When the determination at step (S9) is negative, the process transitions to step (S10). When the determination at step (S9) is positive, the process returns to step (S7).

At step (S10), it is determined whether the DPF regeneration has ended. When the determination is positive, the exhaust throttle device (8) is fully opened at step (S11), and the process returns to step (S5). When the determination at step (S10) is negative, the process returns to step (S7).

When an accumulated time in which the temperature of the exhaust (5) detected by the exhaust temperature sensor (38) at the exhaust inlet (12a) of the DPF (12) is maintained in the DPF regeneration temperature region has reached a predetermined time, the determination at step (S10) is positive. When the accumulated time has not reached the predetermined time, the determination at step (S10) is negative. The DPF regeneration temperature region is set to be, for example, 600° C. to 650° C. The pressure difference between the exhaust inlet (12a) and the exhaust exit (12b) of the DPF (12) may be detected by a pressure difference sensor (37), and the determination at step (S10) may be positive when the pressure difference is smaller than the predetermined pressure, or the determination at step (S10) may be negative when the pressure difference is equal to or larger than the predetermined pressure. When the temperature of the exhaust (5) detected by an exhaust temperature sensor (39) on the exhaust exit (12b) side of the DPF (12) has reached an anomalous temperature exceeding a predetermined upper limit temperature, the DPF regeneration is put to an emergency stop. The upper limit temperature is set to be, for example, 700° C.

A main configuration and advantage related to the DPF regeneration are as follows.

As illustrated in FIGS. 1A to 1C, the configuration includes the catalyst (4), the exhaust temperature sensor (9), and the exhaust throttle device (8), which are disposed on the exhaust upstream side of the DPF (12), and the control device (10) configured to control the exhaust temperature sensor (9) and the exhaust throttle device (8) to cooperate with each other.

As illustrated in FIGS. 1A to 1C and 4, catalyst activation processing and then DPF regeneration processing are performed under control of the control device (10). In the catalyst activation processing, the target temperature of the exhaust (5) at the exhaust exit (4b) of the catalyst (4) is set to be in a first temperature region (E1), and the opening degree of the exhaust throttle device (8) is controlled. In the DPF regeneration processing, the target temperature is set to be in a second temperature region (E2), the target temperature of the exhaust (5) at the exhaust inlet (12a) of the DPF (12) is set to be in a third temperature region (E3), the opening degree of the exhaust throttle device (8) is controlled, and unburned fuel is supplied into the exhaust (5).

As illustrated in FIG. 4, the second temperature region (E2) is set to be higher than the first temperature region (E1), the third temperature region (E3) is set to be higher than the second temperature region (E2), and a temperature difference (T12) between the first temperature region (E1) and the second temperature region (E2) is set to be larger than a temperature difference (T23) between the second temperature region (E2) and the third temperature region (E3).

This engine has the following advantage.

At transition from the catalyst activation processing to the DPF regeneration processing, the exhaust throttle device (8) is gradually opened when the temperature of the exhaust (5) is increased through catalytic combustion of unburned fuel in the DPF regeneration processing in which the target temperature is the high second temperature region (E2). Accordingly, a contingent situation due to abrupt opening of the exhaust throttle device (8), in other words, a contingent situation in which the temperature of the exhaust (5) abruptly decreases due to abrupt decrease of the back pressure, unburned fuel supply by the post-injection or the like is stopped, and the DPF regeneration is stagnated is unlikely to occur, and thus the DPF regeneration is promoted.

As illustrated in FIG. 4, the temperature difference (T12) between the first temperature region (E1) for catalyst activation and the second temperature region (E2) for catalytic combustion is the range of 200° C. to 300° C., and the temperature difference (T23) between the temperature region (E2) for catalytic combustion and the third temperature region (E3) for DPF regeneration is the range of 50° C. to 150° C.

As illustrated in FIG. 4, the ratio of the temperature differences (T12) and (T23) is 300:50 at maximum and 200:150 at minimum, in other words, 6:1 at maximum and 1.3:1 at minimum.

When the ratio of the temperature differences (T12) and (T23) exceeds 6:1 and the temperature difference (T12) increases, the second temperature region (E2) for catalytic combustion becomes too high, which is likely to cause thermal degradation of the exhaust throttle device (8). When the ratio becomes below 1.3:1 and the temperature difference (T12) decreases, the second temperature region (E2) for catalytic combustion becomes too low, and the exhaust throttle device (8) abruptly opens in the DPF regeneration processing. Accordingly, a contingent situation due to the abrupt opening of the exhaust throttle device (8), in other words, a contingent situation in which the temperature of the exhaust (5) abruptly decreases due to abrupt decrease of the back pressure, unburned fuel supply by the post-injection or the like is stopped, and the DPF regeneration is stagnated is likely to occur, and thus the DPF regeneration is stagnated.

The post-injection is stopped when the temperature of the exhaust (5) becomes lower than the catalyst activation temperature region.

As illustrated in FIGS. 1A to 1C and 3, when the exhaust inlet (4a) of the catalyst (4) is clogged by an unburned adhered object, clogging removal processing is performed under control of the control device (10). In the clogging removal processing, the target temperature of the exhaust (5) at the exhaust inlet (4a) of the catalyst (4) is set to be in the burning temperature region (E0) of the unburned adhered object, and the opening degree of the exhaust throttle device (8) is controlled.

This engine has the following advantage.

The unburned adhered object clogging the exhaust inlet (4a) of the catalyst (4) is burned through the clogging removal processing, and the clogging of the exhaust inlet (4a) of the catalyst (4) is reduced.

The following describes the second embodiment.

An engine according to the second embodiment is different from that of the first embodiment at the following points.

As illustrated in FIG. 5, the exhaust throttle device (8) and the EGR valve device (27) are connected with in series with the bypass water path (22).

This engine has the following advantage.

Since the bypass path (22) is shared, the number of bypass water paths can be reduced.

Since the bypass water path (22) connected with the exhaust throttle device (8) and the EGR valve device (27) is not connected with the EGR cooler (23), the amount of the bypass cooling water (24a) supplied to the EGR cooler (23) is not reduced due to the water path resistances of the exhaust throttle device (8) and the EGR valve device (27). Accordingly, the cooling efficiency of the EGR cooler (23) is maintained high, and the EGR ratio does not decrease.

As illustrated in FIG. 5, the EGR valve device (27) is connected upstream of the bypass water path (22), and the exhaust throttle device (8) is connected downstream of the bypass water path (22).

In the engine, the bypass cooling water (22a) at appropriate temperature having absorbed heat from the EGR valve device (27) is supplied to the exhaust throttle device (8) at high temperature, thereby preventing actuation defect of the exhaust throttle device (8) due to overcooling.

As illustrated in FIG. 1A, the EGR valve device (27) is disposed downstream of the EGR cooler (23) on the flow path of the EGR gas (23a).

In the engine, the EGR gas (23a) at relatively low temperature cooled by the EGR cooler (23) is supplied to the EGR valve device (27), and thus a thermal load on the EGR valve device (27) is small. Accordingly, when the supply amount of the bypass cooling water (22a) has decreased due to the water path resistance of the exhaust throttle device (8) as illustrated in FIG. 5, no problem occurs to cooling of the EGR valve device (27), which leads to reduction of thermal degradation of the EGR valve device (27).

As illustrated in FIG. 5, the main water path (21) has a configuration which the main cooling water (21a) is driven by the cooling water pump (25) to sequentially circulate through a water jacket (20d) of the cylinder block (20a), a water jacket (20e) of the cylinder head (20b), and the radiator (26).

The bypass path (22) is led out from the water jacket (20d) of the cylinder block (20a).

This engine has the following advantage.

The bypass cooling water (22a) separated from the main cooling water (21a) at relatively low temperature yet to be heated to high temperature at the cylinder head (20b) is supplied to the EGR valve device (27) and the exhaust throttle device (8), which leads to increase of cooling performance of the EGR valve device (27) and the exhaust throttle device (8).

As illustrated in FIG. 5, the bypass path (22) connected with the exhaust throttle device (8) is led out from the water jacket (20d) of the cylinder block (20a).

This engine has the following advantage.

The bypass cooling water (22a) separated from the main cooling water (21a) at relatively low temperature yet to be heated to high temperature at the cylinder head (20b) is supplied to the exhaust throttle device (8), which leads to increase of cooling performance of the exhaust throttle device (8).

As illustrated in FIG. 5, the bypass path (22) connected with the EGR valve device (27) is led out from the water jacket (20d) of the cylinder block (20a).

This engine has the following advantage.

The bypass cooling water (22a) separated from the main cooling water (21a) at relatively low temperature yet to be heated to high temperature at the cylinder head (20b) is supplied to the EGR valve device (27), which leads to increase of cooling performance of the EGR valve device (27).

Other configurations and functions are same as those of the engine according to the first embodiment. In FIG. 5, any component identical to that in the first embodiment is denoted by an identical reference sign in FIG. 2 and the like.

What is claimed is:

1. An engine comprising:
   a DPF having an exhaust inlet;
   a catalyst having an exhaust exit, an exhaust temperature sensor, and an exhaust throttle device that are disposed on an exhaust upstream side of the DPF, the exhaust exit of the catalyst being spaced from the exhaust inlet of the DPF on the exhaust upstream side of the DPF and the exhaust throttle device being positioned between the exhaust exit of the catalyst and the exhaust inlet of the DPF; and
   a control device configured to control the exhaust temperature sensor and the exhaust throttle device to cooperate with each other and configured to control catalyst activation processing and thereafter DPF regeneration processing,
   wherein:
   in the catalyst activation processing, a target temperature of the exhaust at the exhaust exit of the catalyst is set to be in a first temperature region, and then an opening degree of the exhaust throttle device is controlled, and
   in the beginning of the DPF regeneration processing, the target temperature of the exhaust at the exhaust exit of the catalyst is set to be in a second temperature region, then an opening degree of the exhaust throttle device is controlled, and unburned fuel is supplied into the exhaust, based on the target temperature.

2. The engine according to claim 1, wherein the exhaust temperature sensor is disposed between the catalyst and the exhaust throttle device on an exhaust downstream side of the catalyst.

3. The engine according to claim 1, wherein the exhaust temperature sensor is disposed at a position on an exhaust downstream side of the exhaust throttle device on an exhaust downstream side of the catalyst and close to the exhaust throttle device.

4. The engine according to claim 1, wherein clogging removal processing is performed under control of the control device when an exhaust inlet of the catalyst is clogged by an unburned adhered object, and in the clogging removal processing, a target temperature of the exhaust at the exhaust inlet of the catalyst is set to be in a burning temperature region of the unburned adhered object, and then the opening degree of the exhaust throttle device is controlled.

5. The engine according to claim 2, wherein clogging removal processing is performed under control of the control device when an exhaust inlet of the catalyst is clogged by an unburned adhered object, and in the clogging removal processing, a target temperature of the exhaust at the exhaust inlet of the catalyst is set to be in a burning temperature region of the unburned adhered object, and then the opening degree of the exhaust throttle device is controlled.

6. The engine according to claim 3, wherein clogging removal processing is performed under control of the control device when an exhaust inlet of the catalyst is clogged by an unburned adhered object, and in the clogging removal processing, a target temperature of the exhaust at the exhaust inlet of the catalyst is set to be in a burning temperature region of the unburned adhered object, and then the opening degree of the exhaust throttle device is controlled.

7. The engine according to claim 1, wherein, in the DPF regeneration processing, after the temperature of the exhaust at the exhaust exit of the catalyst has reached the second temperature region, the target temperature of the exhaust at the exhaust exit of the catalyst is set to be in a third temperature region, and the unburned fuel is supplied into the exhaust based on the target temperature.

8. The engine according to claim 7, wherein the second temperature region is set to be higher than the first temperature region, the third temperature region is set to be higher than the second temperature region, and a temperature difference between the first temperature region and the second temperature region is set to be larger than a temperature difference between the second temperature region and the third temperature region.

* * * * *